(12) United States Patent
Kudo

(10) Patent No.: US 7,159,643 B2
(45) Date of Patent: Jan. 9, 2007

(54) HEAT STORING ELEMENT AND METHOD FOR MANUFACTURING HEAT STORAGE APPARATUS USING THE ELEMENT

(75) Inventor: Tomohide Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 10/777,439

(22) Filed: Feb. 12, 2004

(65) Prior Publication Data
US 2004/0194908 A1    Oct. 7, 2004

(30) Foreign Application Priority Data
Feb. 19, 2003   (JP) .............................. 2003-041567

(51) Int. Cl.
  *F28D 20/00*   (2006.01)
  *B21K 21/00*   (2006.01)
(52) U.S. Cl. ................................... 165/10; 29/890.034
(58) Field of Classification Search .................. 165/10, 165/4, 8, 104.17, 163, 172; 392/341; 422/168; 29/890.034
See application file for complete search history.

(56) References Cited

U.S. PATENT DOCUMENTS

| | | | | |
|---|---|---|---|---|
| 3,854,530 A | * | 12/1974 | Jouet et al. .................. | 165/163 |
| 3,875,994 A | * | 4/1975 | Lewakowski et al. ........ | 165/10 |
| 3,943,994 A | * | 3/1976 | Cleveland ..................... | 165/10 |
| 3,999,596 A | * | 12/1976 | Barnard ......................... | 165/8 |
| 4,017,347 A | * | 4/1977 | Cleveland ..................... | 165/10 |
| 4,061,183 A | * | 12/1977 | Davis ............................ | 165/8 |
| 4,114,600 A | * | 9/1978 | Newton ........................ | 165/10 |
| 4,200,441 A | * | 4/1980 | Honmann et al. ............ | 165/10 |
| 4,403,645 A | * | 9/1983 | MacCracken ................ | 165/10 |
| 4,445,566 A | * | 5/1984 | Laing et al. .................. | 165/10 |
| 5,143,148 A | * | 9/1992 | Merryfull ..................... | 165/10 |
| 5,598,720 A | * | 2/1997 | MacCracken et al. ........ | 165/10 |
| 6,820,681 B1 | * | 11/2004 | Ohgami et al. ............... | 165/10 |
| 7,025,119 B1 | * | 4/2006 | Ike ................................ | 165/10 |
| 7,035,532 B1 | * | 4/2006 | Kudo ........................... | 165/10 |
| 2003/0017086 A1 | * | 1/2003 | Bruck et al. ................. | 422/168 |
| 2004/0197090 A1 | * | 10/2004 | Kudo .......................... | 392/341 |
| 2004/0251011 A1 | * | 12/2004 | Kudo .......................... | 165/172 |

FOREIGN PATENT DOCUMENTS

JP    11-264683    9/1999

* cited by examiner

*Primary Examiner*—Ljiljana Ciric
(74) *Attorney, Agent, or Firm*—Hamre, Schumann, Mueller & Larson, P.C.

(57) ABSTRACT

Appropriate amount of brazing material is put on each of inner and outer recessed portions of a first heat storing element. Then, the first heat storing element is placed close to and substantially parallel to a second heat storing element, and an inner projected portion of the second heat storing element is fitted into the inner recessed portion of the first heat storing element, and simultaneously an outer projected portion of the second heat storing element is fitted into the outer recessed portion of the first heat storing element.

4 Claims, 12 Drawing Sheets

HEAT STORING ELEMENT AND METHOD FOR MANUFACTURING HEAT STORAGE APPARATUS USING THE ELEMENT

FIELD OF THE INVENTION

The present invention relates to an improved method for manufacturing a heat storage apparatus of a type where heat energy is exchanged between heat storing materials and heat exchanging fluid, as well as an improvement in heat storing elements for use in the heat storage apparatus.

BACKGROUND OF THE INVENTION

Today, with an increasing demand for storing heat energy using inexpensive midnight electric power and taking out the stored heat energy during the day for hot-water supply, heating and other purposes, higher performance is required of heat storage apparatus.

Among various examples of conventionally-known heat storage apparatus is a heat-storage type heat exchanger apparatus disclosed, for example, in Japanese Patent Application Laid-open Publication No. HEI-11-264683 (hereinafter called "Patent Document 1"). FIG. 11 shows the heat-storage type heat exchanger apparatus disclosed in Patent Document 1, which includes a multiplicity of fluid passageways 3 (only one of which is shown in FIG. 11) each formed of ceramic wall sections 2a into a rectangular sectional shape. As a medium, such as air, is fed to the fluid passageways 3, the medium absorbs heat energy held by phase change materials 4. Specifically, as seen in FIG. 12, a heat storing body 1, generally in the form of a ceramic honeycomb structure 2, has, in addition to the fluid passageways 3, a multiplicity of chambers each having a rectangular sectional shape and accommodating the phase change material 4.

FIG. 13 is a fragmentary enlarged view of a circled portion 13 of FIG. 12, which particularly shows the above-mentioned phase-change-material accommodating chambers 101. In the figure, the chamber 101 is defined by partition wall sections 102, 103, 104 and 105, and the fluid passageway 3 is defined by partition wall sections 104, 106, 107 and 108.

To form the ceramic honeycomb structure 2 of FIG. 13, the ceramic material has to be subjected to various steps including component adjustment, powder-pressurizing molding, provisional burning and main burning, which would result in increased manufacturing costs. Metal extrusion molding might be among possible effective solutions for lowering the manufacturing costs; however, the metal extrusion molding would present the following problems.

FIG. 14 is explanatory of the problems presented by the technique disclosed in Patent Document 1. Mold 110 to be described below would be required in order to form, by extrusion molding, the phase-change-material accommodating chambers 101, fluid passageways 3 and partition wall sections 102–108. Namely, the mold 110 must have blocks 111 for forming the phase-change-material accommodating chambers 101, peripheral gaps 112, 113, 114 and 115 around the blocks 110, thin blocks 116 for forming the fluid passageways 3, peripheral gaps 114, 117, 118 and 119 around the thin blocks 110, and bridges 121 connecting and supporting the blocks 111 and 116.

Because a predetermined quantity of the phase change materials 4 must be retained in the apparatus, it is difficult to change the sectional area of the phase-change-material accommodating chambers 101 with a view to reducing the size and weight of the honeycomb structure 2. The sectional area of the fluid passageway 3, on the other hand, can be reduced if a flow rate of the fluid (heat exchanging medium) is increased. For example, doubling the fluid flow rate can halve a width (corresponding to a thickness t1 of the thin blocks 116) of the fluid passageways 3. The reduced width of the fluid passageways 3 can attain a reduced size of the honeycomb structure 2.

For reduction in the size of the honeycomb structure 2, the thickness t1 of the thin blocks 116 in FIG. 14 must be reduced in accordance with a desired reduced width of the fluid passageways 3. During the exclusion molding, a flowing metal material is interrupted by the blocks 111 and thin blocks 116 and thereby passes through the gaps 112–115 and 117–119, and such a flow of the metal material would produce a force operating on the blocks 111 and 116 in a direction perpendicular to the sheet of the figure.

If the thickness of the thin blocks 116 is reduced below a given value, the thin blocks 116 would lack rigidity and thus undesirably deform due to the above-mentioned operating force. In addition, only thin bridges 121 can be provided for the thin blocks 116, so that the blocks 116 can not be supported sufficiently by the thin bridges 121. Therefore, with the extrusion molding, it is difficult to reduce the width (t1) of the fluid passageways 3.

The increased sectional area of the fluid passageways 3 increases the amount of the fluid staying within the heat storage apparatus, which results in increased volume and weight of the apparatus and increased heat mass of the fluid. To compensate for the increased volume, weight and heat mass, extra heat energy would be required, so that heat energy tends to run short during a heat release operation by the apparatus.

Thus, there has been a demand for a more sophisticated technique which permits use of metal extrusion molding and yet can reduce the width of the fluid passageways.

SUMMARY OF THE INVENTION

In view of the foregoing prior art problems, it is an object of the present invention to provide an improved method for manufacturing a heat storage apparatus and an improved heat storing element for use in the heat storage apparatus which permit use of metal extrusion molding and yet can reduce a width of a fluid passageway.

In order to accomplish the above-mentioned object, the present invention provides a heat storing element for use in a heat storage apparatus, which comprises: a pair of inner and outer partition wall sections opposed in substantial parallel relation to each other with a predetermined distance therebetween, the inner and outer partition wall sections each having a substantial vortex (or comma) shape; an inner connection section interconnecting respective one ends of the inner and outer partition wall sections, the inner connection section having a projected portion and a recessed portion; and an outer connection section interconnecting respective other ends of the inner and outer partition wall sections, the outer connection section having a projected and a recessed portion, the heat storing element being produced by extrusion molding.

According to the present invention, a plurality of heat storing elements constructed in the above-identified manner are joined together to provide a heat storage apparatus, in which a heat-storing-material accommodating chamber is defined in each of the heat storing elements and one or more fluid passageways for passing therein heat exchanging fluid are each defined by a gap between the inner partition wall of one of the heat storing elements and the outer partition wall of another of the heat storing elements that adjoins the one heat storing element. In this invention, the heat-storing-material accommodating chamber is formed through the extrusion molding of the heat storing element, while the fluid passageway is not formed through the extrusion molding. Namely, the heat-storing-material accommodating chamber is defined by the opposed inner and outer partition walls and the inner and outer connection sections of the heat storing element integrally formed by the extrusion molding, and the fluid passageway is defined by the inner partition wall of one of two adjoining heat storing elements and the outer partition wall of the other of the two adjoining heat storing elements. Because the fluid passageway is formed through other means than the extrusion molding, each of the heat storing elements can be manufactured with utmost ease by the extrusion molding.

The heat storing element of the present invention may further comprise a plurality of ribs formed between the opposed inner surfaces of the inner and outer partition wall sections so that a plurality of the heat-storing-material accommodating chambers are provided in the heat storing element, and each of the ribs may have a recess formed across its thickness to allow passage therethrough of fluid.

The provision of the ribs can enhance the rigidity and manufacturing accuracy of the heat storing element. The recess formed in each of the ribs permits fluid communication between the heat-storing-material accommodating chambers, which can prevent excessive cooling from easily occurring during heat radiation from the heat storing material held in each of the chambers and thereby achieve stable heat energy output.

According to another aspect of the invention, there is provided a method for manufacturing a heat storage apparatus, which comprises: (a) a step of providing a plurality of the above-identified heat storing elements; (b) a step of fitting the recessed or projected portion of the inner connection section of a first one of a given pair of the heat storing elements with the projected or recessed portion of a second one of the pair of the heat storing elements; (c) a step of bonding together the portions, fitted by the step of (b), of the first and second heat storing elements in close contact with each other; (d) a step of fitting the recessed or projected portion of the outer connection section of the first heat storing element with the projected or recessed portion of the outer connection section of the second heat storing element; (e) a step of bonding together the portions, fitted by the step of (d), of the first and second heat storing elements in close contact with each other; and (f) a step of repeating the steps of (a)–(e) until the plurality of heat storing elements are joined together, to thereby provide a heat storage apparatus which has one or more heat-storing-material accommodating chambers defined in each of the heat storing elements and one or more fluid passageways for passage therein of heat exchanging fluid, each of the fluid passageways being defined by a gap between the inner partition wall of one of the heat storing elements and the outer partition wall of another of the heat storing elements that adjoins the one heat storing element.

Because the fluid passageway is defined between two adjoining heat storing elements, the passageway can be readily formed into a reduced width. Thus, the amount of the fluid staying in the heat storage apparatus can be minimized, which can reduce the size and weight of the heat storage apparatus. Further, because heat mass in the fluid can also be minimized, higher performance of the heat storage apparatus can be attained.

In addition, because the fitted portions of the heat storing elements can be accurately positioned and firmly secured to each other and reliably sealed, for example, by brazing or bolt-and-nut fastening, the present invention can readily manufacture a heat storage apparatus of high accuracy.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Figure 1:
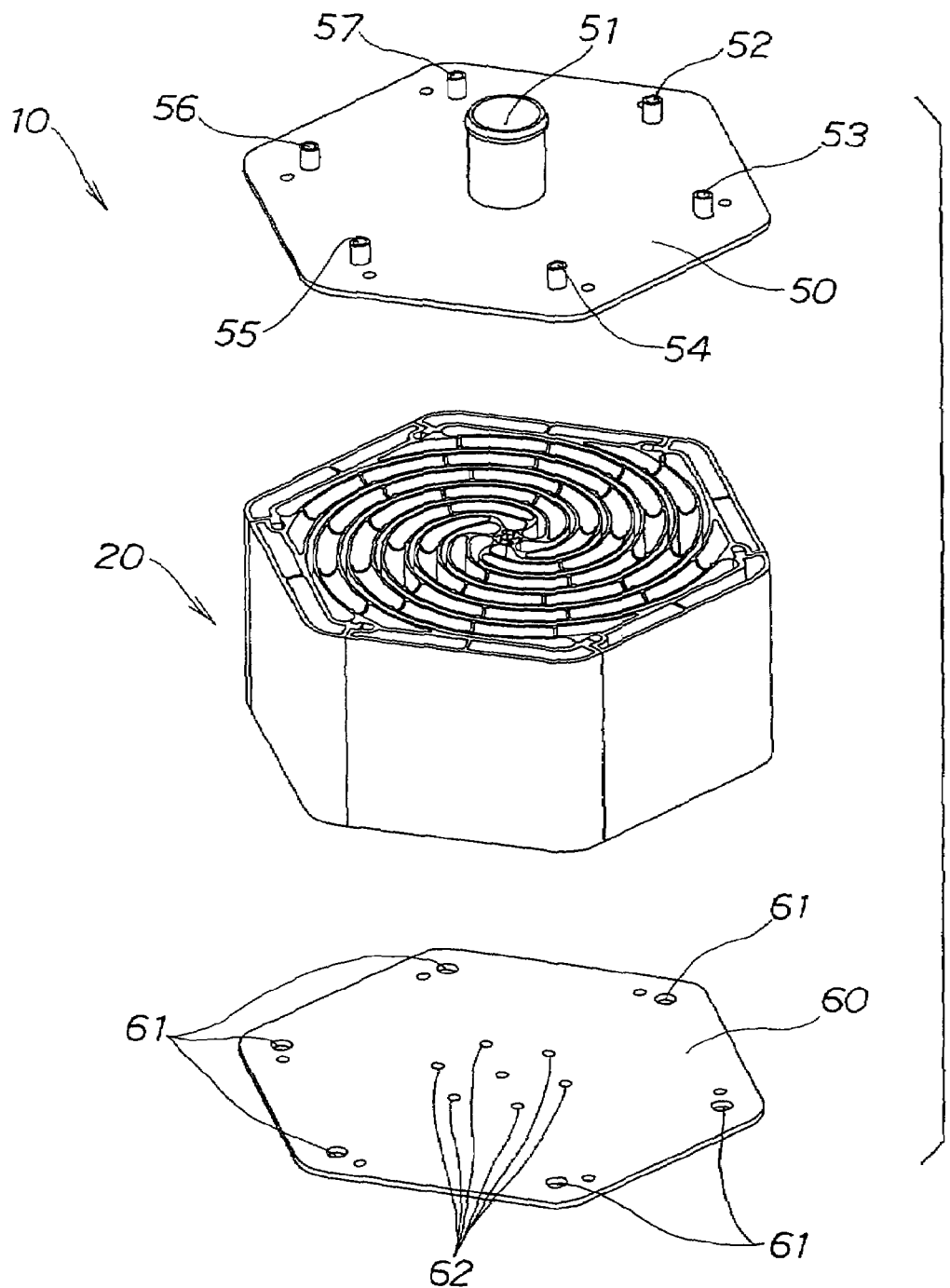
FIG. 1 is an exploded perspective view of a heat storage apparatus in accordance with an embodiment of the present invention.

FIG. 1 is an exploded perspective view of a heat storage apparatus 10 in accordance with an embodiment of the present invention, which includes a heat storing body 20 generally in the shape of a hexagonal column, an upper lid 50 covering the upper surface of the heat storing body 20 and a connection plate 60 closing the lower surface of the heat storing body 20. The connection plate 60 may function as a lower lid.

The upper lid 50 has a heat exchanging fluid inlet 51 formed in its center, and six heat storing material inlets 52, 53, 54, 55, 56 and 57 formed around the central inlet 51 and near its six corners.

The connection plate 60 has six holes 61 for passage therethrough of heat exchanging fluid and six holes 62 for passage therethrough of a heat storing material.

The lower surface of the upper lid 50 and upper surface of the connection plate 60 are coated with flexible resin, such as EPDM (Ethylene-Propylene-Diene Monomer rubber), to ensure air tightness between the lid 50 and connection plate 60 and the heat storing body 20.

Figure 2:
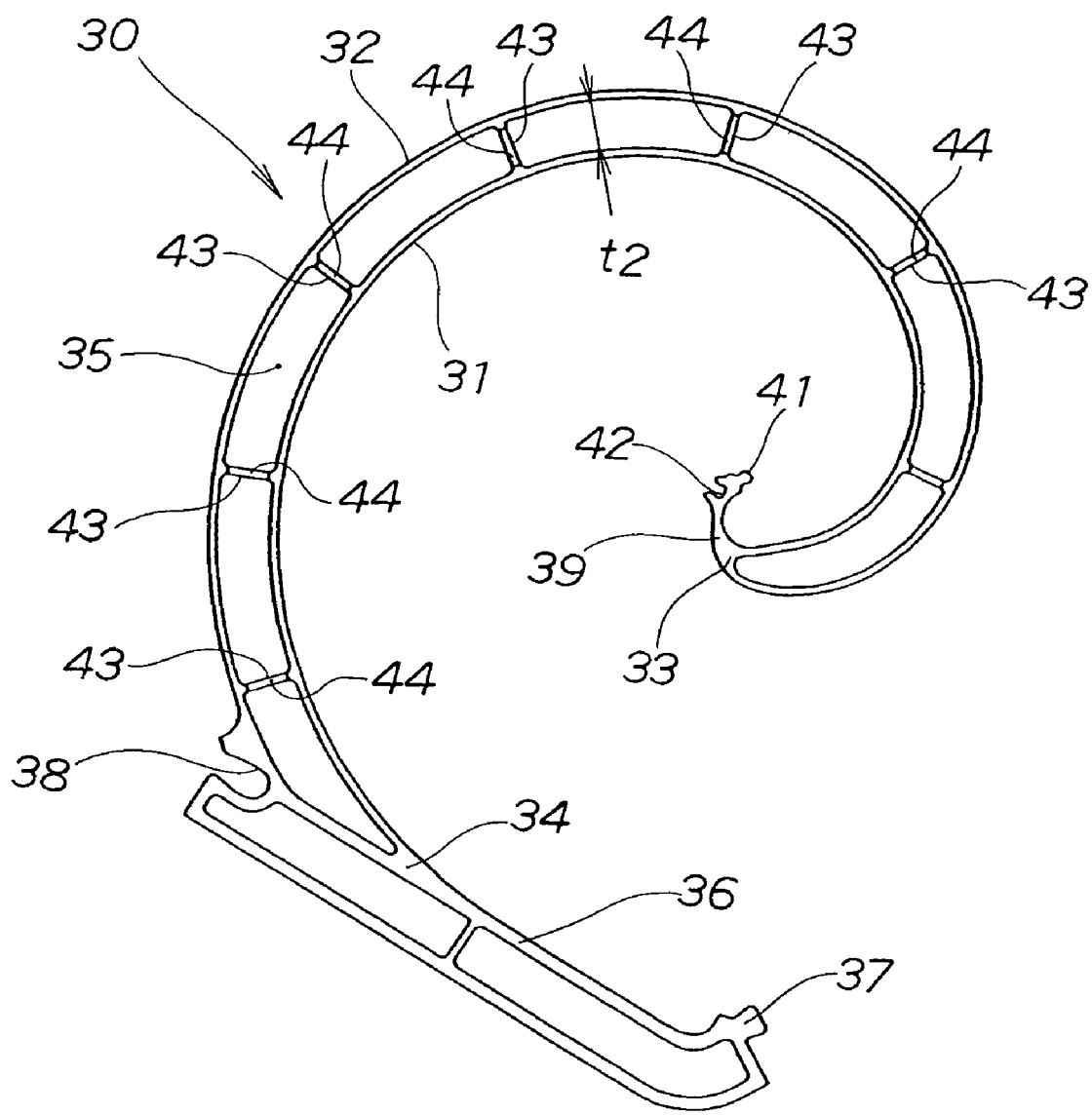
FIG. 2 is a plan view of one of a plurality of heat storing elements employed in the heat storage apparatus of the invention.

FIG. 2 is a plan view of a heat storing element 30 employed in the heat storage apparatus of the present invention. The heat storing element 30, disposed in the heat storing body 20, has an inner partition wall section 31 of a substantial vortex shape (or inverted comma shape), and an outer partition wall section 32 of the same spiral shape opposed in substantial parallel relation to the inner partition wall section 31 with a predetermined distance t2. One end of the inner partition wall section 31 and one end of the outer partition wall section 32 are interconnected via an inner connection section 33 while the other end of the inner partition wall section 31 and the other end of the outer partition wall section 32 are interconnected via an outer connection section 34, to provide a space of a closed section in the heat storing element 30. The closed-sectional space can function as heat-storing-material accommodating chambers 35, as will be detailed later.

The outer connection section 34 includes a rectangular-sectional section 36 having an outer connecting projected portion 37 formed at its distal end. The rectangular-sectional section 36 also has an outer connecting recessed portion 38 formed at the other end near a boundary with the outer partition wall section 32. The rectangular-sectional section 36 may be filled with a heat insulating material.

The inner connection section 33 includes a curved-sectional section 39, and inner connecting projected and recessed portions 41 and 42 formed at its distal end.

It is desirable to provide a plurality of reinforcing ribs 43 between the opposed surfaces of the inner and outer partition wall sections 31 and 32, so that the predetermined distance t2 can be maintained accurately and the inner and outer partition wall sections 31 and 32 can have a reduced thickness. However, because movement of the heat storing material within the closed-sectional space of the heat storing element 30 is limited due to presence of the ribs 43, it is also desirable to form a recess 44 of a semicircular sectional shape in each of the ribs 43 in order to promote movement of the heat storing material within the closed-sectional space.

Because the heat storing element 30 has a generally uniform sectional configuration, it can be mass-produced by extrusion-molding a metal material (e.g., aluminum alloy) and then cutting a resultant molded workpiece into predetermined lengths. The recesses 44 of the ribs 43 may be formed by machining, after the cutting of the molded workpiece.

The following paragraphs describe how the heat storage apparatus 10 is assembled using a plurality of the above-described heat storing elements 30.

Figure 3:
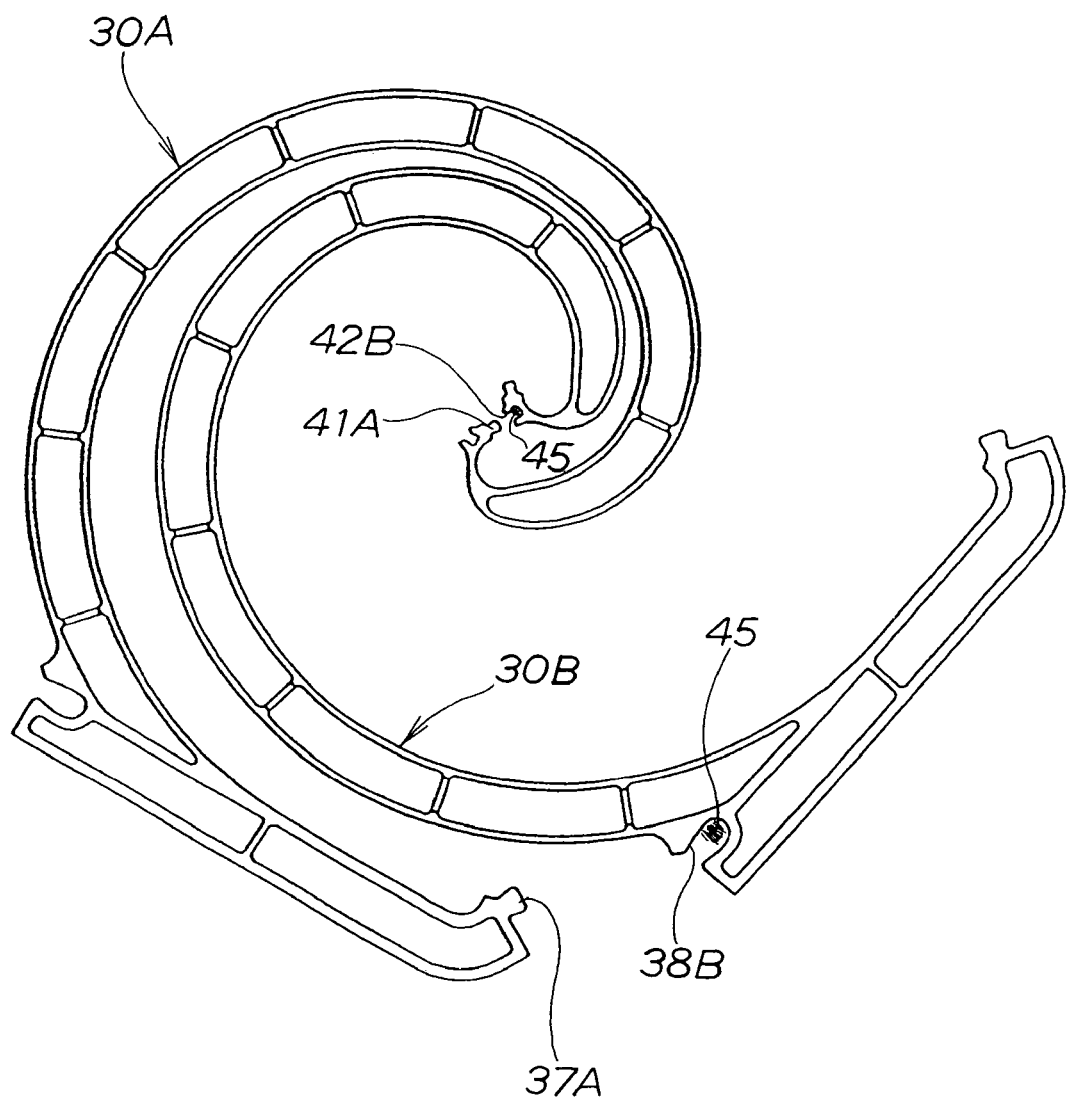
FIG. 3 is a first view explanatory of how the heat storage apparatus of the invention is assembled.

FIG. 3 is a first view explanatory of an example manner in which the heat storage apparatus 10 is assembled, which particularly explains steps of interconnecting two (first and second) heat storing elements 30. For convenience of the following description, suffixes "A" and "B" are attached respectively to the reference numerals of the first and second heat storing elements and to various components thereof; for example, the first heat storing element is represented by 30A, the second heat storing element by 30B, and so on.

First, an appropriate amount of brazing material 45 is put on each of the inner and outer recessed portions 42B and 38B of the second heat storing element 30B.

Then, the second heat storing element 30B is placed close to and substantially parallel to the first heat storing element 30A, and the inner connecting projected portion 41A of the first heat storing element 30A is fitted into the inner connecting recessed portion 42B of the second heat storing element 30B, and simultaneously the outer connecting projected portion 37A of the first heat storing element 30A is fitted into the outer connecting recessed portion 38B of the second heat storing element 30B. By keeping the brazing material 45 at a predetermined brazing temperature, the inner connecting projected portion 41A of the first element 30A can be bonded firmly to the inner connecting recessed portion 42B of the second element 30B in close contact therewith, and simultaneously the outer connecting projected portion 37A of the first element 30A can be bonded firmly to the outer connecting recessed portion 38B of the second element 30B in close contact therewith.

Figure 4:
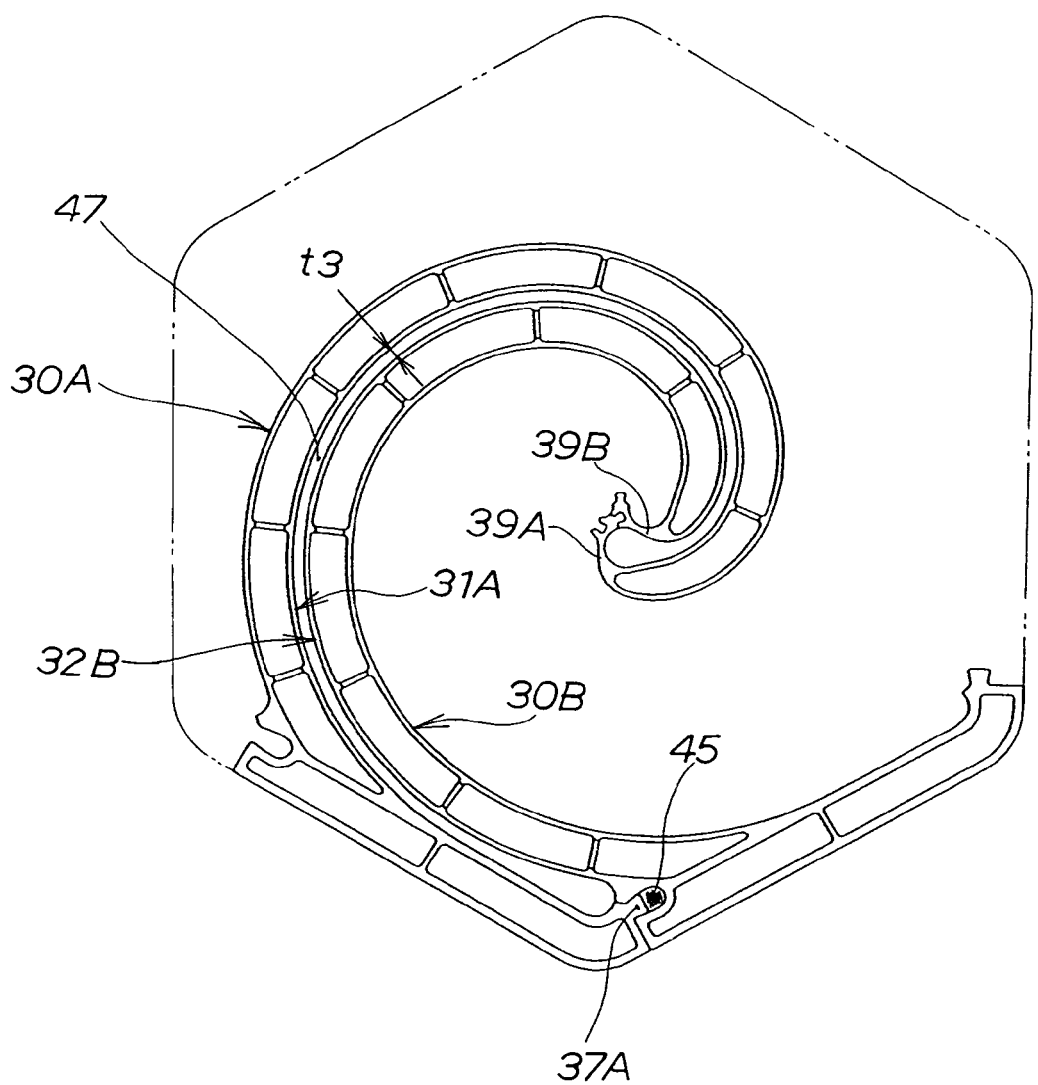
FIG. 4 is a second view explanatory of how the heat storage apparatus of the invention is assembled.

FIG. 4 is a second view explanatory of the manner in which the heat storage apparatus 10 is assembled, which particularly shows the first and second heat storing elements 30A and 30B having been integrally joined or bonded with each other with the second element 30B fitted in the first element 30A. In a similar manner, three or more heat storing elements 30 can be fitted and joined with one another.

What is important here is that a fluid passageway 47 is formed between the inner and outer partition walls of every two adjoining heat storing elements 30 (in the illustrated example of FIG. 4, between the inner partition wall section 31A of the first heat storing element 30A and the outer partition wall section 32B of the second heat storing element 30B). The fluid passageway 47 has a width t3 that can be determined independently of the extrusion molding. Namely, the width t3 can be changed as desired by adjusting the shapes of the curved sections 39A, 39B and outer connecting projected portion 37A. Therefore, the width t3 of the fluid passageway 47 can be set to a very small value, as necessary.

Figure 5:
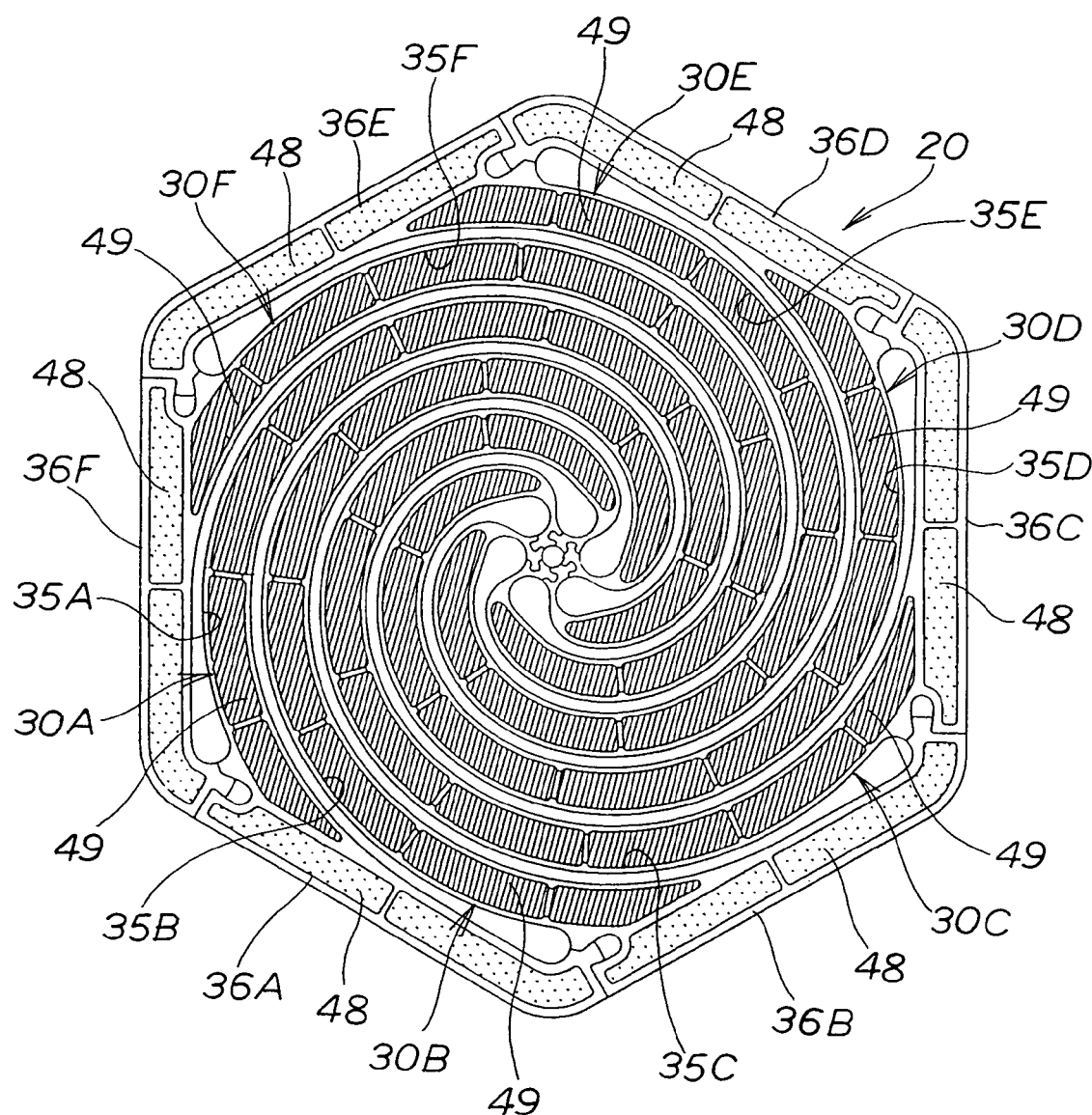
FIG. 5 is a third view explanatory of how the heat storage apparatus of the invention is assembled.

FIG. 5 is a third view explanatory of the manner in which the heat storage apparatus of the invention is assembled. By repeating the above-described steps, six heat storing elements 30A–30F are joined together to provide the heat storing body 20 generally in the shape of a hexagonal column. In this state, the heat storing body 20 is heated up to the brazing temperature as noted earlier in relation to FIG. 3.

Next, a heat insulating material 48 is filled into the six rectangular-sectional sections 36A–36F, and heat storing materials 49 is later filled into the six heat-storing-material accommodating chambers 35A–35F.

The heat storing material 49—is a material variable from a liquid phase to a solid phase, such as a sugar alcohol material like paraffin, erythritol, xylitol or solbitol, or sulfate hydrate like hydrate of magnesium nitrate.

Referring back to FIG. 1, the heat storage apparatus 10 of the present invention can be provided by attaching the upper lid 50 and connecting plate 60 to the heat storing body 20 having a hexagonal columnar shape.

Figure 6:
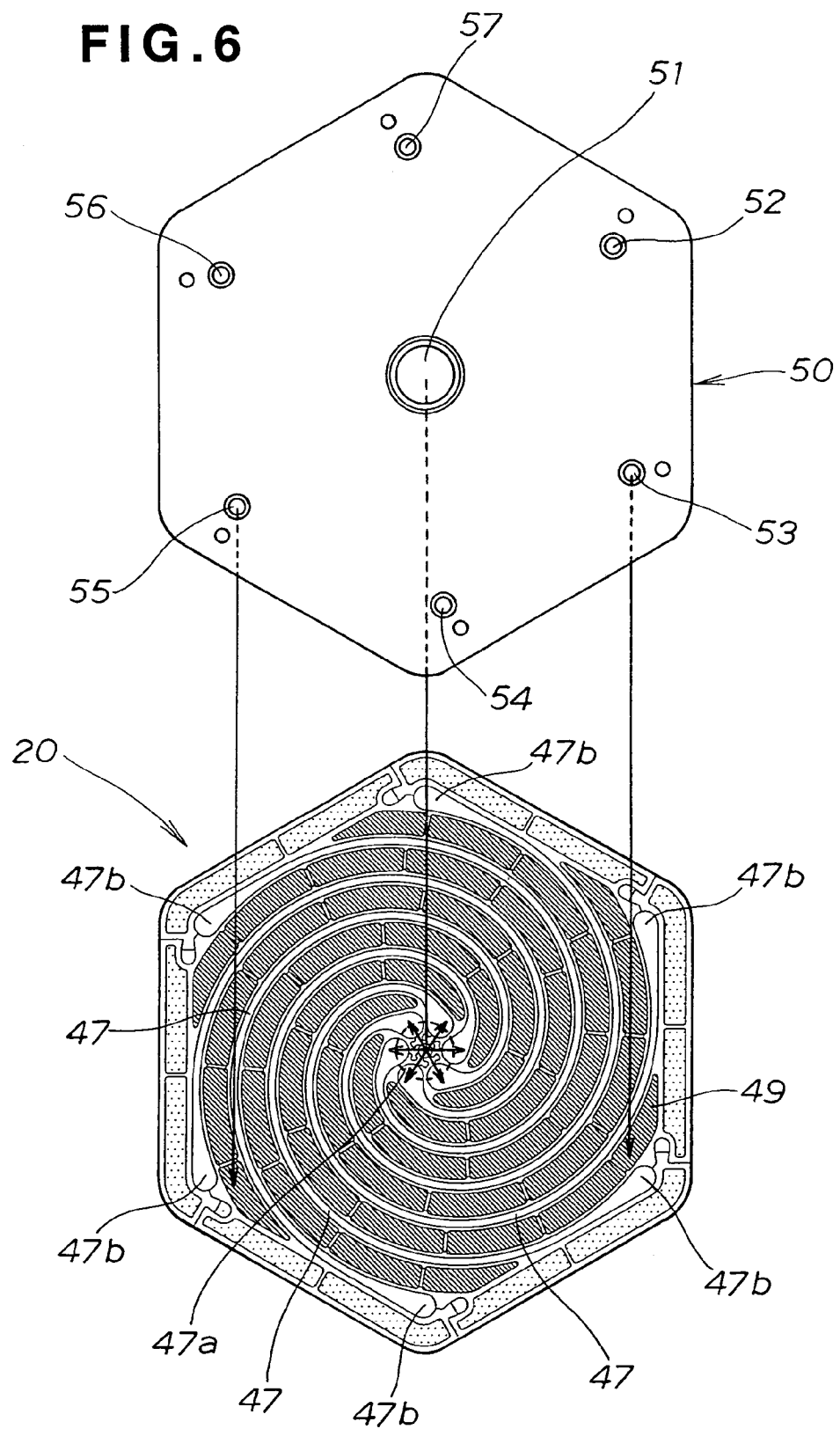
FIG. 6 is a view explanatory of a manner in which heat exchanging fluid is supplied to and passed through the heat storage apparatus and heat storing materials are enclosed in the heat storage apparatus.

FIG. 6 is a view explanatory of a manner in which heat exchanging fluid is supplied and passed through the apparatus and the heat storing material is enclosed in the apparatus. Note that the heat storing body 20 and upper lid 50 are shown separately in the figure for convenience of explanation. Once the heat exchanging fluid is supplied through the central fluid inlet 51 of the upper lid 50, the heat exchanging fluid hits respective inner end portions 47a of the six fluid passageways 47, split into six streams flowing uniformly into the six fluid passageways 47 to effect heat exchange there, and reaches respective outer end portions 47b of the passageways 47. After that, the heat exchanging fluid flows downward through the heat-exchanging-fluid passage holes 61 (see FIG. 1) of the connection plat 60.

The heat storing material 49 is poured sequentially into the individual heat-storing-material accommodating chambers 35 (see FIG. 2) through the heat storing material inlets 52, 53, 54, 55, 56 and 57.

Next, a description will be given about behavior of the heat storage apparatus 10 arranged in the above-described manner.

Figure 7A:
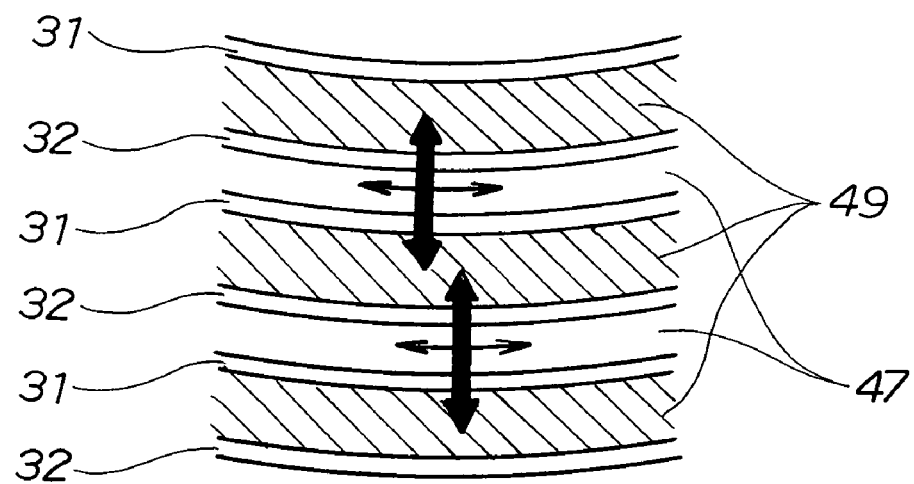
FIGS. 7A and 7B are views explanatory of behavior of the heat storage apparatus of the invention.
Figure 7B:
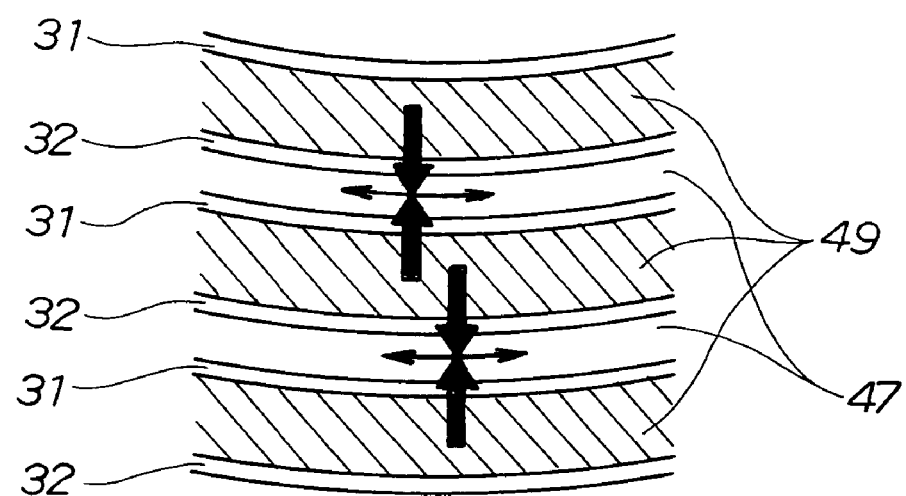

FIGS. 7A and 7B are views explanatory of the behavior of the heat storage apparatus 10, where portions of only three heat storing elements 30 are shown here to facilitate illustration although the apparatus 10 in practice includes six heat storing elements 30. FIG. 7A illustrates heat storing operation by the elements 30. As relatively-hot heat exchanging fluid flows within the fluid passageways 47 in a direction of thin arrows (from the inner end portion to the outer end portion or from the outer end portion to the inner end portion of the passageways 47), heat transfers from the fluid to the heat storing material 49 (thick arrow), so that the heat storing material 49 stores the heat. At that time, the heat storing material 49 stores great energy as latent heat.

FIG. 7B illustrates heat radiating operation by the heat storing elements 30. As relatively-cold heat exchanging fluid flows within the fluid passageways 47 in a direction of thin arrows (from the inner end portion to the outer end portion or from the outer end portion to the inner end portion of the passageways 47), heat is radiated from the heat storing material 49 (thick arrow), so that the exchanging fluid becomes hotter.

Figure 8:
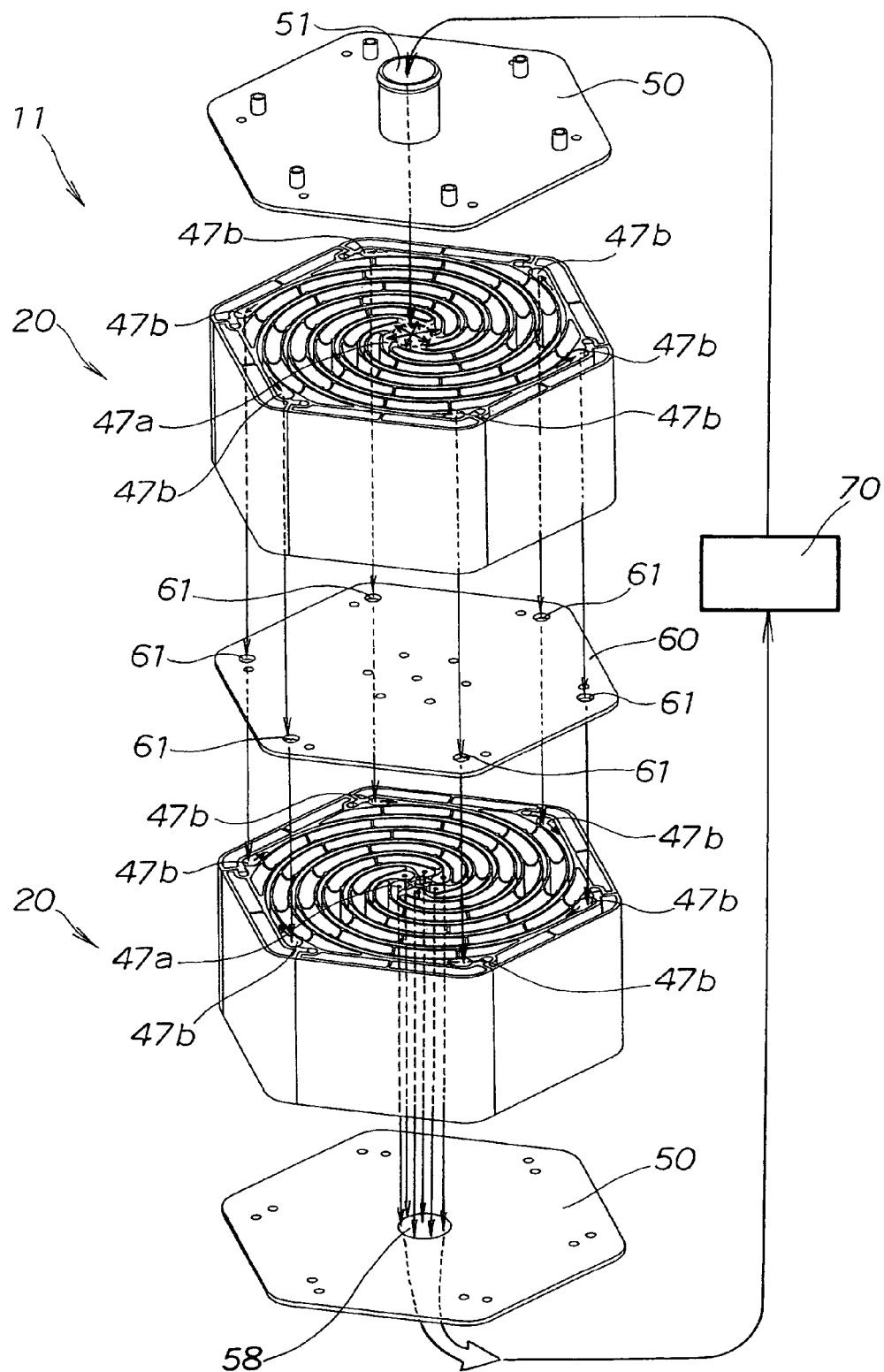
FIG. 8 is a view explanatory of a manner in which heat exchanging fluid is supplied to and passed through a multi-stage heat storage apparatus of in accordance with another embodiment of the invention.

FIG. 8 is an exploded perspective view explanatory of how the heat exchanging fluid is caused to flow through a multi-stage heat storage apparatus 11 in accordance with another embodiment of the present invention. The multi-stage heat storage apparatus 11 comprises a first set of the upper lid 50, heat storing body 20 and connection plate 60 having been described in relation to FIG. 1, and a second set of a similar lid 50, heat storing body 20 and connection plate 60 attached to the first set in opposite relation thereto.

Operation for recovering waste heat from an engine 70 will be described with reference to FIG. 8.

When heat storage is desired, relatively-hot cooling water discharged from the engine 70 in operation is introduced, through the fluid inlet 51 located at one end of the multi-stage heat storage apparatus, into the first or upper heat storing body 20 and directed to the respective inner end portions 47a of the six fluid passageways 47. Then, the cooling water flows within the passageways 47 from the inner end portions 47a toward the outer periphery of the storing body 20, during which the heat storing material 49 adjacent to the passageways 47 takes and stores heat (see FIG. 7A). Then, the cooling water having reached the outer end portions 47b of the fluid passageways 47 flows through the passage holes 61, formed in the connection plate 60, into the respective outer end portions 47b of the six fluid passageways 47 of the second or lower heat storing body 20.

After that, the cooling water flows within the passageways 47 from the outer end portions 47b toward the inner end portions 47a, during which the heat storing material 49 adjacent to the passageways 47 stores heat (see FIG. 7A). Then, the cooling water having got colder is discharged through the fluid outlet 58 of the second heat storing body 20 (i.e., formed at the other end of the apparatus) and transferred back to the engine 70.

When heat radiation is desired, relatively-cold cooling water discharged from the engine 70 is introduced through the fluid inlet 51 into the first heat storing body 20 and directed to the respective inner end portions 47a of the six fluid passageways 47. Then, the cooling water flows within the passageways 47 from the inner end portions 47a toward the outer periphery of the storing body 20, during which the cooling water takes heat from the heat storing material 49 adjacent to the passageways 47 (see FIG. 7B). Then, the cooling water having reached the outer end portions 47b of the fluid passageways 47 flows, through the passage holes 61 of the connection plate 60, into the respective outer end portions 47b of the six fluid passageways 47 of the second heat storing body 20.

After that, the cooling water flows within the passageways 47 from the outer end portions 47b toward the inner end portions 47a, during which the cooling water takes heat from the heat storing material 49 adjacent to the passageways 47 (see FIG. 7B). Then, the cooling water having got hotter is discharged through the fluid outlet 58 of the second heat storing body 20 formed at the other end of the apparatus and transferred back to the engine 70.

The cooling water having got hotter due to the above action serves to promote or speed up warming-up of the engine 70.

Further, because the plurality of the vortex-shaped heat storing elements can be coupled together via the fitting engagement between the projected and recessed portions, the width of the fluid passageways 47 between the heat storing elements can be minimized, and the minimized passageway width can minimize the amount of the fluid staying in the heat storage apparatus and thereby can enhance a rate or efficiency of the heat exchange both during the heat storage operation and during the heat radiation operation. As a result, a small, lightweight and high-performance heat storage apparatus 20 can be provided.

The following paragraphs describe an example of an arrangement for completely joining together the heat storing elements by sealing gaps in the outer and inner connection sections of the heat storing elements in the heat storage apparatus.

Figure 9:
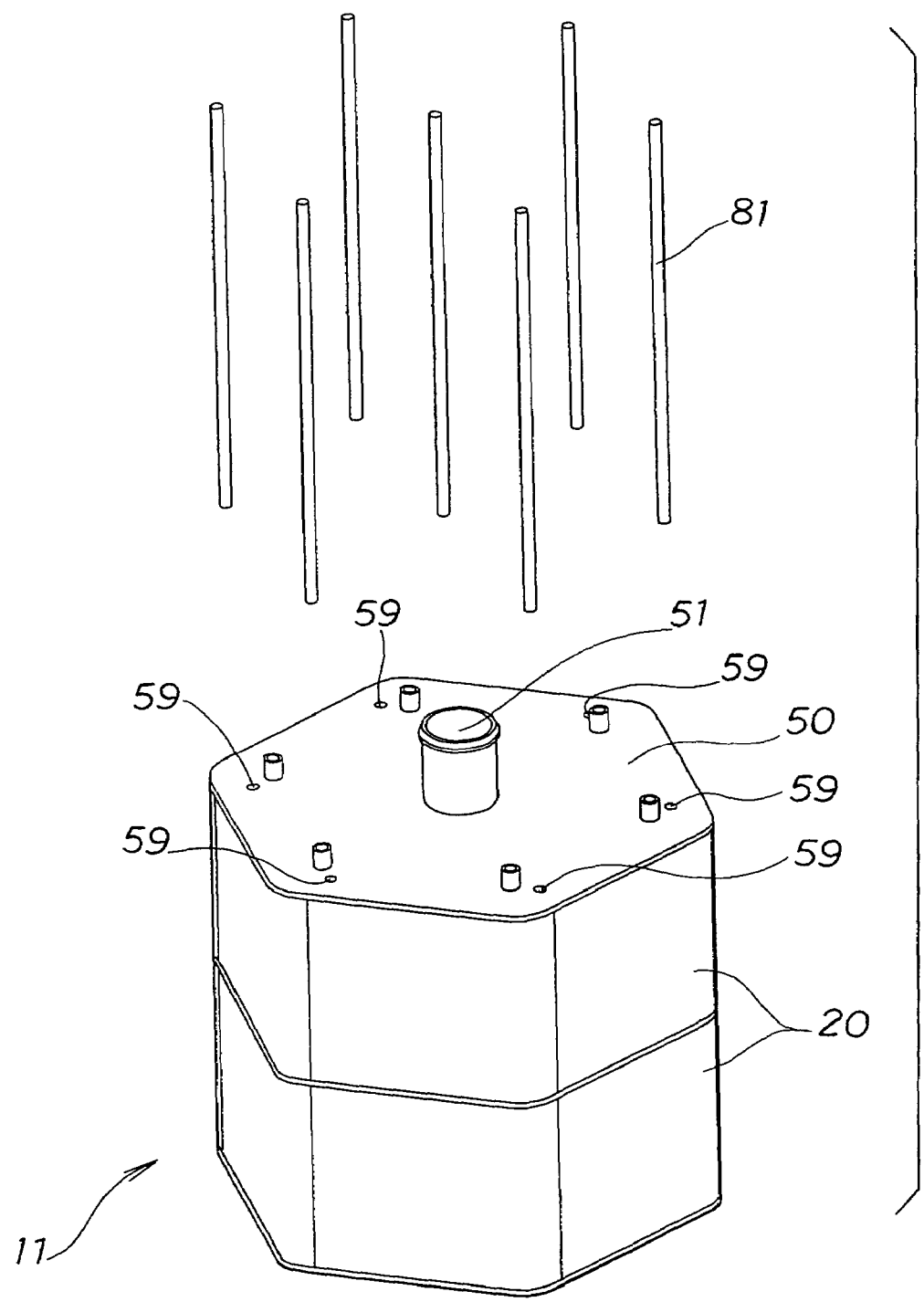
FIG. 9 is a perspective view explanatory of how various components in the heat storage apparatus are joined together by brazing.

FIG. 9 is a perspective view explanatory of how various components, including one or more heat storing bodies 20, one or more lids 50 and connection plate 60, of the heat storage apparatus are joined together by brazing. Rod-shaped brazing materials 81 are inserted into the center of the fluid inlet 51 and a plurality of fitting holes 59 of the upper lid 50 and passed through spaces between individual coupling portions of the six heat storing elements in each of the first and second (upper and lower) heat storing bodies 20, after which the brazing is performed. If vacuum brazing is employed for the brazing, the rectangular-sectional sections 36A–36F (see FIG. 5) can be used as vacuum heat insulating spaces, and the performance of the heat storage apparatus can be improved even further.

Figure 10:
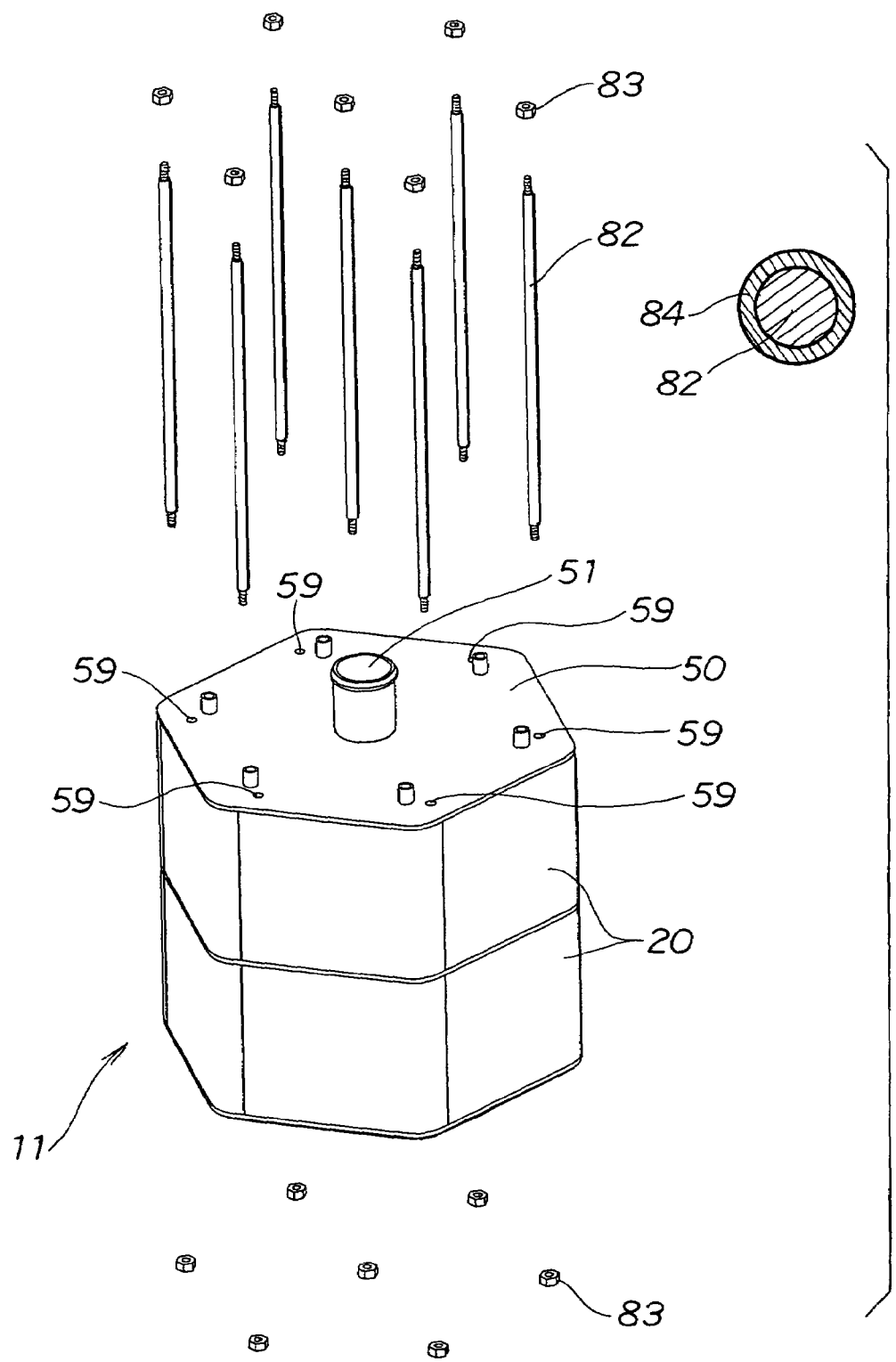
FIG. 10 is a perspective view explanatory of another embodiment wherein the various components are joined together by bolt-and-nut fastening.
Figure 11:
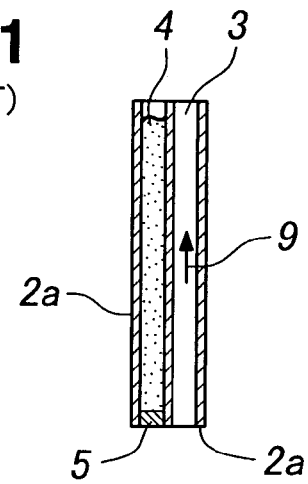
FIG. 11 is a sectional view showing part of a conventional heat-storage type heat exchanger apparatus.
Figure 12:
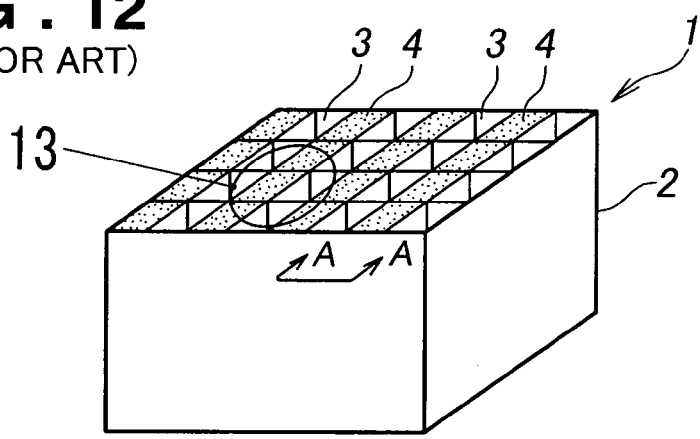
FIG. 12 is a perspective view of the conventional heat-storage type heat exchanger apparatus of FIG. 11.
Figure 13:
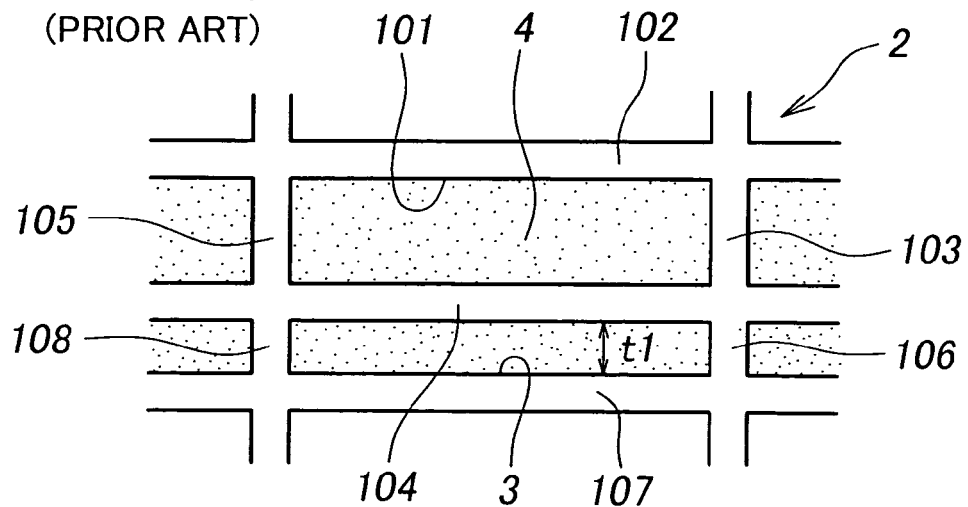
FIG. 13 is a fragmentary enlarged view of a circled portion in FIG. 12.
Figure 14:
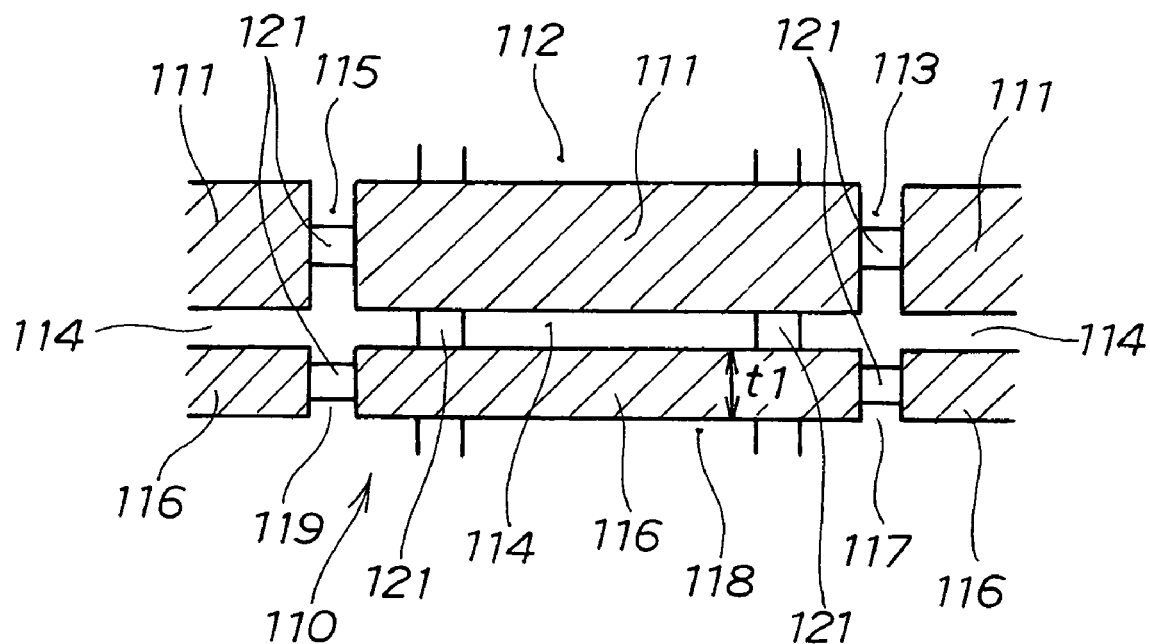
FIG. 14 is explanatory of problems presented by the conventional heat-storage type heat exchanger apparatus.

FIG. 10 is a perspective view explanatory of another embodiment wherein the various components, including one or more heat storing bodies 20, one or more lids 50 and connection plate 60, of the heat storage apparatus are joined together by bolt-and-nut fastening. Bolts 82 are inserted into the center of the fluid inlet 51 and the fitting holes 59 of the upper lid 50 and passed through the spaces between the individual coupling portions of the six heat storing elements in each of the first and second (upper and lower) heat storing bodies 20, after which the bolts are tightened with upper and lower nuts 83. Then, each of the bolt-and-nut fasteners (i.e., each set of the bolt 82 and upper and lower nuts 83) may be coated together, for example, with flexible EPDM (Ethylene-Propylene-Diene Monomer rubber): a coating layer of the EDPM rubber 84 can enhance the air tightness of the heat storage apparatus. In such a case, the lower surface of the upper lid 50 and both sides of the connection plate 60 may also be coated with similar flexible EPDM rubber to enhance the air tightness.

Further, the one or more heat storing bodies 20, one or more lids 50 and connection plate 60, of the heat storage apparatus may be joined together by other means than the brazing and bolt-and-nut fastening, such as ultrasonic bonding, laser beam bonding, adhesive agent, etc.

Further, each of the heat storing elements provided in the heat storing body only has to be of a substantial vortex shape, have, in its inner and outer connection sections, the projected portion and recessed portion for fitting engagement with another of the heat storing elements. The number of the heat storing elements, the number of the heat-storing-material accommodating chambers in each of the heat storing elements, the number of the recessed ribs, etc. may be chosen as desired.

In summary, the present invention is characterized in that the fluid passageways are formed through other means than the extrusion molding. Thus, each of the heat storing elements can be manufactured with utmost ease by the extrusion molding. The present invention is also characterized in that the fluid passageways are each defined between two adjoining heat storing elements. Thus, the passageways can be readily formed into a reduced width.

What is claimed is:

1. A heat storing element for use in a heat storage apparatus, said heat storing element comprising:
    a pair of inner and outer partition wall sections opposed in substantial parallel relation to each other with a predetermined distance therebetween, said inner and outer partition wall sections each having a substantial vortex shape;
    an inner connection section interconnecting respective first ends of said inner and outer partition wall sections, said inner connection section having a projected portion and a recessed potion; and
    an outer connection section interconnecting respective other ends of said inner and outer partition wall sections, said outer connection section having a projected and a recessed portion,
    said heat storing element being produced by extrusion molding.

2. A heat storing element as claimed in claim 1 which further comprises a plurality of ribs formed between opposed inner surfaces of said inner and outer partition wall sections, and wherein each of said ribs has a recess formed across a thickness thereof to allow passage therethrough of fluid.

3. A method for manufacturing a heat storage apparatus, comprising:
    (a) a step of providing a plurality of heat storing elements as recited in claim 1;
    (b) a step of fitting the recessed or projected portion of the inner connection section of a first one of a given pair of said heat storing elements with the projected or recessed portion of a second one of the pair of said heat storing elements;
    (c) a step of bonding together the portions, fitted by said step of (b), of the first and second heat storing elements in contact with each other;
    (d) a step of fitting the recessed or projected portion of the outer connection section of the first heat storing element with the projected or recessed portion of the outer connection section of the second heat storing element;
    (e) a step of bonding together the portions, fitted by said step of (d), of the first and second heat storing elements in contact with each other; and
    (f) a step of repeating the steps of (a)–(e) until said plurality of heat storing elements are all joined together, to thereby provide a heat storage apparatus which has one or more heat-storing-material accommodating chambers defined in each of said heat storing elements and one or more fluid passageways for passage therein of heat exchanging fluid, each of said fluid passageways being defined by a gap between the inner partition wall of one of said heat storing elements and the outer partition wall of another of said heat storing elements that adjoins the one heat storing element.

4. A method as claimed in claim 3 wherein the steps of (c) and (e) bond the fitted portions by one of brazing or bolt-and-nut fastening.

* * * * *